United States Patent
Diesterbeck et al.

(10) Patent No.: US 7,765,807 B2
(45) Date of Patent: Aug. 3, 2010

(54) METHOD FOR WARMING-UP A STEAM TURBINE

(75) Inventors: Henri Diesterbeck, Bottrop (DE); Edwin Gobrecht, Ratingen (DE); Karsten Peters, Wesel (DE); Rainer Quinkertz, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 12/083,424

(22) PCT Filed: Sep. 27, 2006

(86) PCT No.: PCT/EP2006/066794
§ 371 (c)(1),
(2), (4) Date: Apr. 11, 2008

(87) PCT Pub. No.: WO2007/042397
PCT Pub. Date: Apr. 19, 2007

(65) Prior Publication Data
US 2009/0249788 A1    Oct. 8, 2009

(30) Foreign Application Priority Data
Oct. 12, 2005    (EP)    ................... 05022278

(51) Int. Cl.
*F01K 13/02*    (2006.01)
*F01K 13/00*    (2006.01)
*F01K 7/34*    (2006.01)
*F01K 23/06*    (2006.01)
*G01N 27/12*    (2006.01)

(52) U.S. Cl. ............................. 60/646; 60/645; 60/653; 60/670; 73/335.05

(58) Field of Classification Search .................. 60/645, 60/646, 653, 670; 73/73, 335.05
See application file for complete search history.

(56) References Cited

U.S. PATENT DOCUMENTS

| | | | | |
|---|---|---|---|---|
| 3,550,849 A | * | 12/1970 | Stewart, Jr. et al. | ........ 236/20 R |
| 3,790,345 A | * | 2/1974 | Mansfield et al. | ............... 436/3 |
| 3,955,403 A | * | 5/1976 | Bodmer | ...................... 73/61.41 |
| 3,965,675 A | | 6/1976 | Martz | |

(Continued)

FOREIGN PATENT DOCUMENTS

DE    1 228 623    11/1966

(Continued)

OTHER PUBLICATIONS

Von A. Bursik; „Elektrische Leitfähigkeit des Betriebsmittels im Wasser-Dampfkreislauf; VGB Kraftwerkstechnik GmbH, Jun. 1994; pp. 543-548, vol. 74, No. 6; XP000450633; Essen; VGB Kraftwerkstechnik GmbH; Germany.

*Primary Examiner*—Thomas E Denion
*Assistant Examiner*—Christopher Jetton

(57) ABSTRACT

The invention relates to a method for heating a steam turbine comprising a high-pressure turbine section and a medium-pressure turbine section and/or a low-pressure turbine section. Said method is characterized by the essential aspect that the high-pressure turbine section is impinged upon by steam having relatively great conductivity while the medium-pressure turbine section or the low-pressure turbine section remains closed during said impingement following a cold start. As soon as the conductivity drops below a certain value, the medium-pressure turbine section or the low-pressure turbine section is also impinged upon by steam.

10 Claims, 1 Drawing Sheet

U.S. PATENT DOCUMENTS

| | | | | |
|---|---|---|---|---|
| 4,339,719 | A | * | 7/1982 | Rhines et al. ............... 324/446 |
| 4,759,314 | A | * | 7/1988 | Banweg et al. ........... 122/406.4 |
| 5,353,628 | A | * | 10/1994 | Bellows ..................... 73/25.01 |
| 2004/0013511 | A1 | | 1/2004 | Brackenhammer |

FOREIGN PATENT DOCUMENTS

| | | |
|---|---|---|
| DE | 2 029 830 A1 | 12/1971 |
| DE | 198 08 596 A1 | 9/1999 |
| JP | 58010104 A | 1/1983 |

* cited by examiner

METHOD FOR WARMING-UP A STEAM TURBINE

CROSS REFERENCE TO RELATED APPLICATIONS

This application is the U.S. National Stage of International Application No. PCT/EP2006/066794, filed Oct. 12, 2005 and claims the benefit thereof. The International Application claims the benefits of European application No. 05022278.5 filed Oct. 12, 2005, both of the applications are incorporated by reference herein in their entirety.

FIELD OF INVENTION

The invention relates to a method for warming-up a steam turbine, wherein the steam turbine comprises a high-pressure turbine section and an intermediate-pressure and/or a low-pressure turbine section, wherein the high-pressure turbine section on the inlet side is fluidically connected via a live steam line to a steam generator, wherein a steam valve is arranged between the high-pressure turbine section and the intermediate-pressure turbine section, wherein the high-pressure turbine section, the live steam line and the steam generator are warmed-up in parallel.

BACKGROUND OF THE INVENTION

In power generating plants, which are equipped with a steam turbine plant for power generation, it can be necessary, depending upon the current power demand, to shut down an individual steam turbine or a plurality of steam turbines and, depending upon requirement, to re-engage them. A quick starting of the respective steam turbine plant in this case is of vital importance. This especially applies to longer shutdown periods, especially after a cold start and after a hot start, for example after a weekend shutdown. According to the prior art, during the starting process a steam generator is first of all run up or heated in order to increase the steam temperature and the steam pressure. As soon as a predetermined starting temperature and a predetermined starting pressure and also a predetermined starting quality for the steam are stable, a starting process for starting the steam turbine is commenced. For this purpose, inter alia, live steam valves are opened to a greater or lesser degree. In this case, the values for the starting temperature, for the starting pressure and for the starting quality of the steam are selected so that after starting the steam turbine a no-load operation or an on-load operation with low load can be realized for the steam turbine. The steam in this case has a conductivity, the value of which has to lie within a predetermined range in order to avoid damage to the steam turbine as a result of impure steam.

During the starting of a steam turbine plant, therefore, the conductivity of the steam is continually determined and only when the steam has fallen below a certain limiting value is it allowed to flow into the steam turbine.

The values for the starting temperature, for the starting pressure and for the starting quality of the steam are selected so that after starting the steam turbine a no-load operation or an on-load operation with low load can be realized for the steam turbine. These parameters must be stable by the time of the commencement of the actual starting process. Depending upon the type of power plant and type of construction of the boiler, or size of the power plant, about 1 to 3 hours can regularly elapse during this. As a result of the exposure to superheat steam admission, high material stresses, due to the thermal expansion stresses which occur, are regularly brought about during starting from a cold machine state. Monitoring by a measurement technique of the thermal expansion stresses is typically carried out today. In this case, an increased interest exists in shortening the starting times for such a steam turbine plant in order to thereby meet the economical efficiency of the steam turbine plant, or of a power generating plant which is equipped with it.

The starting process is customarily commenced only when a predetermined starting quality exists for the steam, especially with regard to cleanliness and pH value. Also, the prewarming process is preferably commenced only when the steam has a predetermined prewarming quality, wherein the starting quality is higher than the prewarming quality. The cost for achieving a high steam quality is relatively high.

A steam turbine which can comprise a plurality of turbine sections is understood by a steam turbine in the sense of the present application. The turbine sections in this case can be designed for different steam parameters, such as temperature and pressure. In this case, high-pressure, intermediate-pressure and low-pressure turbine sections are known. Superheated steam, which can have a temperature of up to 620° C., as a rule flows into the high-pressure turbine section. Furthermore, this superheated steam can have a pressure of up to 300 bar. The superheated steam is also referred to as hot steam. If saturated steam is separated from a solid or condensate and is heated at constant pressure, then the steam becomes increasingly unsaturated. This steam is referred to as hot steam or superheated steam.

The steam space above bottoms or condensate has absorbed the largest amount of molecules possible for an existing steady-state temperature: this steam is referred to as wet steam, dry steam or saturated steam.

An intermediate-pressure turbine section, however, is formed in such a way that the expanded steam from a high-pressure turbine section reaches a reheater, wherein the temperature of the steam is increased in the reheater, and then flows into the intermediate-pressure turbine section. The temperature of the steam which flows into the intermediate-pressure turbine section in this case is at about 600° C., and has a temperature of about 80 bar. The steam which issues from the intermediate-pressure turbine section is finally directed to a low-pressure turbine section.

The subdivision into high-pressure, intermediate-pressure, and low-pressure turbine sections is not uniformly applied within the specialist field. Therefore, the steam parameters, such as temperature and pressure, cannot be used as a single differentiating criterion between a high-pressure, intermediate-pressure and low-pressure turbine section.

Methods for operating steam turbines with reheating of the steam which issues from the high-pressure turbine section and flows into an intermediate-pressure turbine section, are known. As a result of the reheating, the temperature of the steam, which has already performed work in the high-pressure turbine section of a steam turbine, is increased again and therefore increases the available gradients before the steam reaches the low-pressure section of the turbine. Consequently, the efficiency of the plant is increased.

A further advantage of the operation of steam plants or combined cycle power plants with reheating of the steam is that as a result of the reheating, the exhaust wetness of the steam in the final stages of the turbine is reduced and consequently the fluidic quality and the service life is improved.

Reheating is used in steam turbines when the steam becomes too wet during expansion in the machine. The steam, after flowing through a number of stages, is then directed out of the turbine to the reheater, and after that, resupplied to the turbine. In the case of very high pressure gradients, a multiple reheating is used so as not to retain too much steam wetness in the final stage.

SUMMARY OF INVENTION

The invention is based on the object of accelerating the warming-up of a cooled-down steam turbine.

The object is achieved by means of a method for warming-up a steam turbine, wherein the steam turbine comprises a high-pressure turbine section and an intermediate-pressure turbine section and/or a low-pressure turbine section, wherein the high-pressure turbine section on the inlet side is fluidically connected via a live steam line to a steam generator, wherein a steam valve is arranged between the high-pressure turbine section and the intermediate-pressure turbine section, wherein the high-pressure turbine section, the live steam line and the steam generator are warmed-up at the same time, wherein the method comprises the following steps:

Increasing an outlet side back-pressure of the high-pressure turbine section,

Opening a valve which is arranged upstream of the inlet of the high-pressure turbine section as soon as the conductivity of the steam which is produced in the steam generator falls below a tolerance value, Closing the steam valve which is arranged between the high-pressure and intermediate-pressure turbine sections, Governing the rotational speed of the rotor of the high-pressure turbine section at a value below the nominal speed, Reducing the back-pressure as soon as the conductivity of the steam which is produced in the steam generator falls below a limiting value, wherein the limiting value is lower than the tolerance value, Warming-up the intermediate-pressure and/or low-pressure turbine section with the steam which is produced by the steam generator and the conductivity of which is below the limiting value, by opening the steam valve.

The invention is based inter alia on the aspect that it does not seem necessary to simultaneously expose the steam turbine, which comprises high-pressure, intermediate-pressure and low-pressure turbine sections, to admission of steam with sufficiently good quality. Therefore, it is one aspect of this invention that the high-pressure turbine section can be exposed to admission of steam with insufficiently good quality, such as with insufficiently good quality of the conductivity, if the method steps according to the invention are taken into account. After a cold start, the warming-up of the steam turbine commences with a corresponding pressure build-up in the live steam line. The live steam line in most cases is prewarmed at the same time with the steam generator. The steam generator is also referred to as a boiler. The initial opening of the steam valves is dependent upon the conductivity of the steam, upon the superheating, and upon the absolute temperatures of the steam. The steam in this case must have a certain quality. Steam with insufficient quality can lead to an increased corrosion stress as a result of aggressive contaminants, which for example in the region of an incipient steam wetness disadvantageously affects fatigue strength under reversed bending stress of the blade materials. However, the problem of insufficient steam quality is focused upon the low-pressure turbine section, since particularly high loads of the final stages occur here. The high-pressure turbine section, in comparison to the low-pressure turbine section, can be exposed to admission of steam which has a poorer conductivity than steam to the admission of which the low-pressure turbine section is exposed.

The warming-up of the entire steam turbine, as measured by the prior art, commences only when there is an acceptable conductivity of the steam, whereas according to the invention it is proposed to prewarm the high-pressure turbine section together with the live steam lines and the steam generator, with an intermediate-pressure turbine section and/or low-pressure turbine section closed.

Since for high-pressure turbine sections comparatively low requirements for the conductivity of the steam are made, the admission with steam can already be commenced with high conductivities. For this, the steam valve which is arranged upstream of the intermediate-pressure turbine section is closed. As a result, a back-pressure at the outlet of the high-pressure turbine section can be produced, which within the limitations of permissible values can be almost optionally increased. Consequently, warming-up with high condensation heat is carried out.

An important aspect of the invention on the one hand is that steam with comparatively high electrical conductivity is permitted for prewarming the high-pressure turbine section, and on the other hand that the back-pressure at the outlet of the high-pressure turbine section is increased for commencement of a prewarming phase, and is reduced again before a subsequent running-up to nominal speeds. This steam first of all flows through the high-pressure turbine section. The pressure of the steam at the outlet of the high-pressure turbine section is increased. This is achieved for example by a flap or a valve which is arranged between the high-pressure and intermediate-pressure turbine sections and which can be partially or completely closed. As a result of the increase of pressure, the heat transfer of the steam onto the thick-walled components of the high-pressure turbine section is improved. The throughflowing steam is accumulated, so to speak, at the outlet, as a result of which a quick warming-up of the high-pressure turbine section is carried out. Consequently, the saturation temperature of the steam is shifted to higher values.

The steps a) and c) can therefore be interchanged.

In the case of a saturation (condensation), heat transfer coefficients of about 5000 W/(m$^2$K) can be achieved, wherein in the case of superheated states (convection) only heat transfer coefficients of about 150 W/(m$^2$K) are achieved. Consequently, the heat yield to the components of the high-pressure turbine section during the prewarming phase can be increased.

With the method according to the invention, a prewarming of the steam turbine can be commenced about 1 to 3 hours earlier. A further advantage is that the heat yield as a result of the higher saturated steam temperature leads to an accelerated warming-up of the components of the high-pressure turbine section. Consequently, the block starting times in the case of a cold start can be shortened by about 1 to 1.5 hours.

In an advantageous development, the tolerance value for the electrical conductivity of the steam is between 0.5 and 5 µsiemens/cm.

Values based on experience have shown that this range of values is especially suitable for the tolerance value.

In a further advantageous development, in step d) the rotational speed of the rotor is governed at values between 100 and 1000 RPM. Consequently, a ventilation is avoided and the possibility is created of already prewarming with low steam mass flows. The rotational speeds in this case are below a prohibited range.

BRIEF DESCRIPTION OF THE DRAWINGS

Exemplary embodiments of the invention are subsequently described in more detail with reference to the drawings. In this case, components which are provided with the same designations have the same principle of operation.

In this case, in the drawing.

DETAILED DESCRIPTION OF INVENTION

Figure 1:
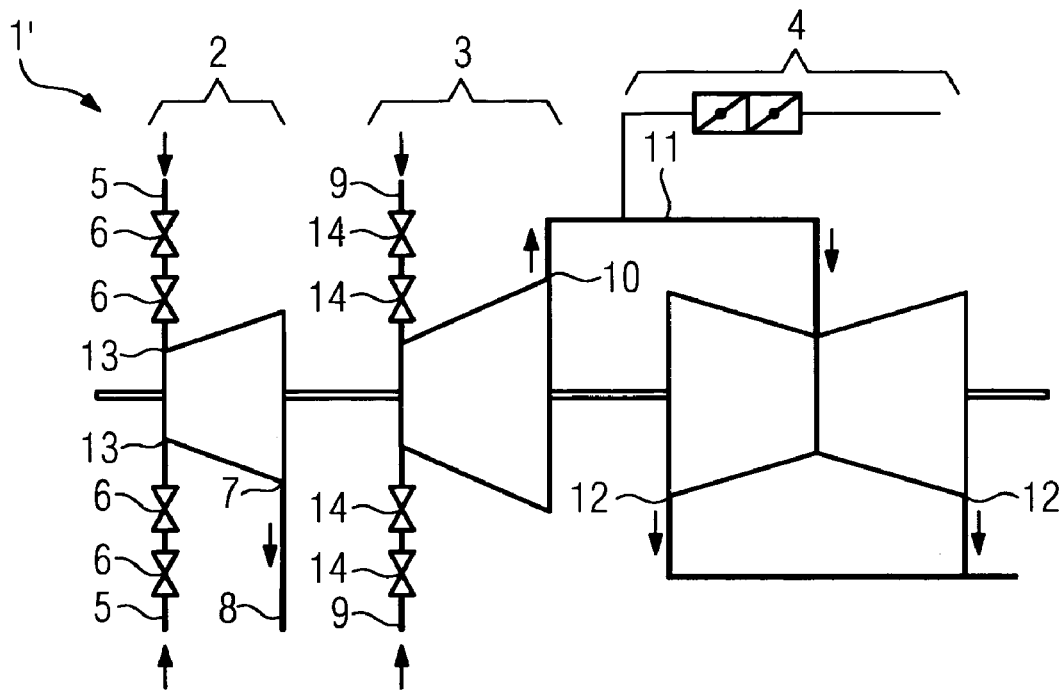
FIG. 1 shows a schematic representation of a steam turbine which comprises a high-pressure, an intermediate-pressure and a low-pressure turbine section.

In FIG. 1, a schematic representation of a steam turbine 1, which comprises a high-pressure turbine section 2, an intermediate-pressure turbine section 3, and a double-flow low-pressure turbine section 4, is shown. The high-pressure turbine section 2 comprises at least two live steam lines 5, wherein valves 6 are arranged in a live steam line 5. The valves 6 are formed for controlling the throughflow of steam which flows through the live steam line 5, The live steam is produced in a steam generator or boiler which is not shown in more detail. Via the live steam line 5 and the valves 6, the steam which is produced in the steam generator reaches the high-pressure turbine section 2, is expanded there, and then issues from the high-pressure turbine section 2 at the outlet 7. Via an exhaust steam line 8, the expanded steam reaches a reheater, which is not shown in more detail, and is heated there to a higher temperature, and is then fed via at least one intermediate-pressure inlet line 9 into the intermediate-pressure turbine section 3. In the intermediate-pressure turbine section 3, the steam is expanded to a lower temperature and a low pressure, and on the outlet side 10 issues from the intermediate-pressure turbine section 3 and into the low-pressure turbine section 4 via a line 11. In the low-pressure turbine section 4, the steam is further expanded. The temperature of the steam drops further in the process. Via outlet lines 12, the steam finally issues from the steam turbine and is guided to a condenser, which is not shown in more detail. The previously described steam guiding is carried out during the requirement-specific operating phase of the steam turbine 1. After a shutdown of more than 48 hours, the steam turbine 1 is in a cooled-down state. The shafts and other thick-walled components in the steam turbine 1 must be prewarmed in a controlled manner before exposing to admission of, or loading with, hot live steam in order to prevent impermissible stresses in the components. The initial opening of the valves 6 is dependent upon the conductivity of the steam, upon the superheating, and upon the absolute values such as pressure p and temperature T of the steam.

The method for warming-up the steam turbine 1 is carried out as described in the following. The steam turbine 1 comprises a high-pressure turbine section 2 and an intermediate-pressure turbine section 3 and/or a low-pressure turbine section 4. At least one HP-MP valve 14 is arranged between the high-pressure turbine section 2 and the intermediate-pressure turbine section 3. The high-pressure turbine section 2, the live steam line 5 and the steam generator are warmed-up at the same time. In a first step, the back-pressure on the outlet side 7 of the high-pressure turbine section is increased. This can be carried out by closing the steam valve 14 which is arranged between the high-pressure and intermediate-pressure turbine sections. In a following step, a valve 6 at the inlet 13 of the high-pressure turbine section 2 is opened as soon as the conductivity of the steam which is produced in the steam generator falls below a tolerance value. This tolerance value can assume values of between 0.5 and 5 μsiemens/cm. The conductivity of the steam which is produced in the steam generator is continuously measured during this and recorded and further utilized in a control station.

In a following step, the rotational speed of the rotor of the high-pressure turbine section 2 is governed at a value below the nominal speed. It has been shown that values for the rotational speed of the rotor at best should be between 100 and 1000 RPM for prewarming the high-pressure turbine section.

In a following step, the back-pressure which prevails on the outlet side 7 is reduced as soon as the conductivity of the steam which is produced in the steam generator falls below a limiting value of 0.2 to 0.5 μsiemens/cm. Also, the reducing of the back-pressure can be carried out by opening the steam valves 14.

The nominal speed is 3000 RPM or 3600 RPM, depending upon with which system frequency, 50 Hz or 60 Hz, the alternating current system is operated. For nuclear power station-steam turbine plants, the nominal speed can be 1500 RPM. In any case, it is of importance that in step d) the rotational speed of the rotor is appreciably below the nominal speed, i.e. by a multiple.

In a following step, the warming-up of the MP and/or LP turbine section 4 with the steam which is produced by the steam generator and the conductivity of which is below the limiting value, is carried out by opening the steam valve which is arranged between the high-pressure and intermediate-pressure turbine sections.

Figure 2:
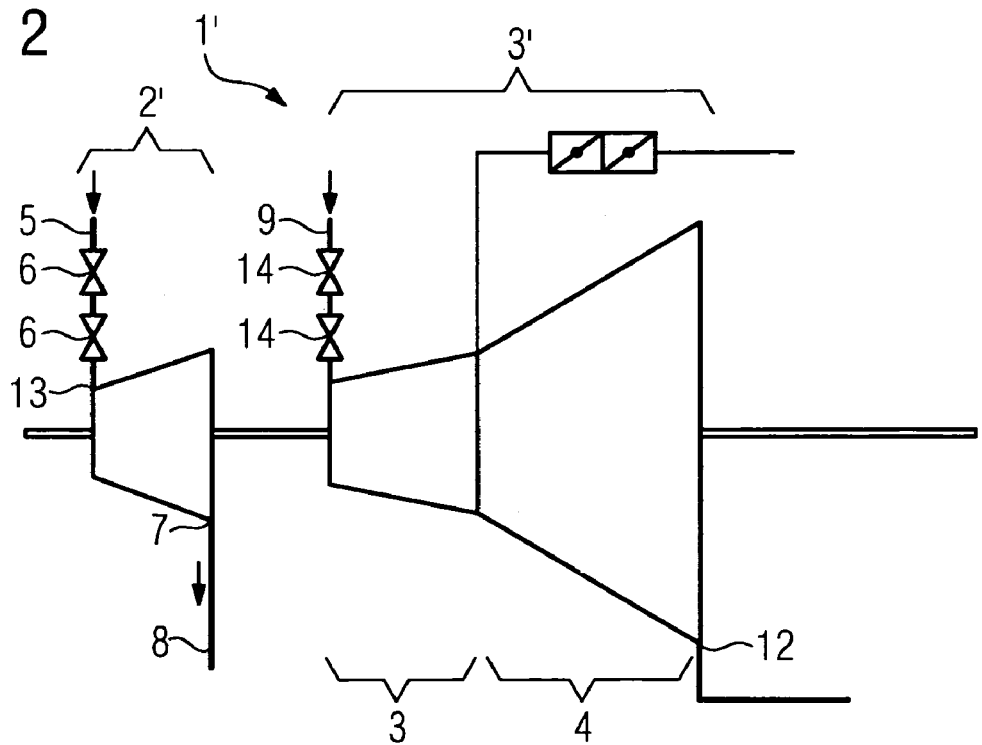
FIG. 2 shows a schematic representation of an alternative steam turbine which comprises a high-pressure, an intermediate-pressure and a low-pressure turbine section.

In FIG. 2, an alternative embodiment of a steam turbine is shown. The steam turbine 1' comprises a high-pressure turbine section 2' and an intermediate-pressure and a low-pressure turbine section 3' which are constructed as a compact unit. The intermediate-pressure and low-pressure turbine section is also referred to as an E-turbine section. A significant difference to the embodiment of the steam turbine which is shown in FIG. 1 is that the steam turbine 1' which is shown in FIG. 2 has no overflow line 11. The principle of operation of the method, with regard to the steam turbine which is shown in FIG. 2, in this case is almost identical to the steam turbine which is described in FIG. 1. One difference is that the steam turbine 1 in FIG. 1 comprises two turbine sections, of which the one is an intermediate-pressure turbine section 3 and the other is a low-pressure turbine section 4, whereas the turbine section 3' which is shown in FIG. 2 comprises both the intermediate-pressure and the low-pressure turbine sections in a single housing.

The invention claimed is:

1. A method for warming-up a steam turbine having a high-pressure turbine section, an intermediate-pressure turbine section and a rotor, comprising:
    fluidically connecting the high-pressure turbine section on the inlet side via a live steam line to a steam generator;
    arranging a steam valve between the high-pressure turbine section and the intermediate-pressure turbine section;
    warming up the high-pressure turbine section, the live steam line and the steam generator simultaneously by:
        increasing an outlet side back-pressure of the high-pressure turbine section,
        opening a valve, arranged upstream of an inlet of the high-pressure turbine section, as soon as the conductivity of the steam which is produced in the steam generator falls below a tolerance value,
        closing the steam valve arranged between the high-pressure turbine section and the intermediate-pressure turbine section,
        governing a rotational speed of the rotor of the high-pressure turbine section at a rotational speed below the nominal speed, reducing the back-pressure as soon as the conductivity of the steam produced in the steam generator falls below a limiting value, wherein the limiting value is lower than the tolerance value, and warming-up the intermediate-pressure turbine section with the steam produced by the steam generator and the conductivity of which is below the limiting value, by opening the steam valve arranged between the high-pressure turbine section and the intermediate-pressure turbine section.

2. The method as claimed in claim 1, wherein the tolerance value is between 0.5 and 5 μsiemens/cm.

3. The method as claimed in claim 1, wherein the value of the rotational speed of the rotor is below a turbine rotor nominal speed.

4. The method as claimed in claim 3, wherein the value of the rotational speed of the rotor is between 100 and 1000 RPM.

5. The method as claimed in claim 4, wherein the limiting value is between 0.2 and 0.5 μsiemens/cm.

6. A method for warming-up a steam turbine having a high-pressure turbine section, a low-pressure turbine section and a rotor, comprising:

fluidically connecting the high-pressure turbine section on the inlet side via a live steam line to a steam generator;

arranging a steam valve between the high-pressure turbine section and the low-pressure turbine section;

warming up the high-pressure turbine section, the live steam line and the steam generator simultaneously by:

increasing an outlet side back-pressure of the high-pressure turbine section, opening a valve, arranged upstream of an inlet of the high-pressure turbine section, as soon as the conductivity of the steam which is produced in the steam generator falls below a tolerance value, closing the steam valve arranged between the high-pressure turbine section and the low-pressure turbine section, governing a rotational speed of the rotor of the high-pressure turbine section at a rotational speed below the nominal speed, reducing the back-pressure as soon as the conductivity of the steam produced in the steam generator falls below a limiting value, wherein the limiting value is lower than the tolerance value, and warming-up the low pressure turbine section with the steam produced by the steam generator and the conductivity of which is below the limiting value, by opening the steam valve arranged between the high-pressure turbine section and the low-pressure turbine section.

7. The method as claimed in claim 6, wherein the tolerance value is between 0.5 and 5 μsiemens/cm.

8. The method as claimed in claim 6, wherein the value of the rotational speed of the rotor is below a turbine rotor nominal speed.

9. The method as claimed in claim 8, wherein the value of the rotational speed of the rotor is between 100 and 1000 RPM.

10. The method as claimed in claim 9, wherein the limiting value is between 0.2 and 0.5 μsiemens/cm.

* * * * *